United States Patent [19]

Stocks

[11] Patent Number: 5,334,813
[45] Date of Patent: Aug. 2, 1994

[54] METAL INERT GAS WELDING SYSTEM FOR USE IN VACUUM

[75] Inventor: Charles D. Stocks, Huntsville, Ala.

[73] Assignee: The United States of America as represented by the Adminstrator of the National Aeronautics and Space Administration, Washington, D.C.

[21] Appl. No.: 123,945

[22] Filed: Sep. 20, 1993

[51] Int. Cl.⁵ .................................................. B23K 9/00
[52] U.S. Cl. .................................... 219/72; 219/137 R
[58] Field of Search ........................ 219/72, 75, 137 R

[56] References Cited

U.S. PATENT DOCUMENTS

| | | | |
|---|---|---|---|
| 2,933,594 | 4/1960 | Johnson et al. | 219/72 |
| 3,600,549 | 8/1971 | Olshansky et al. | 219/72 |
| 4,174,477 | 11/1979 | Essers et al. | 219/75 |
| 5,149,932 | 9/1992 | Poorman et al. | 219/72 |

*Primary Examiner*—Clifford C. Shaw
*Attorney, Agent, or Firm*—Robert L. Broad, Jr.; Guy M. Miller

[57] ABSTRACT

Disclosed are a device and a method for inert gas plasma welding in a low pressure or vacuum environment. The device comprises: (1) a pre-plasma cavity having (a) a first opening therein capable of accepting an inert gas into the pre-plasma cavity, (b) first and second electrodes within the pre-plasma cavity capable of applying an electromagnetic field to the inert gas to thereby convert the inert gas into a plasma and (c) a second opening capable of allowing the plasma to exit the pre-plasma cavity and (2) a structure capable of directing the plasma from the second opening of the pre-plasma cavity to an arc welding cavity adjacent the second opening, the arc welding cavity capable of being placed adjacent to a working surface, the arc welding cavity further capable of accepting a welding material therein, the plasma impinging on the working surface and the welding material, the directing means focusing the plasma within the arc welding cavity to thereby increase a rate of heat transfer between the plasma and the working surface and the welding material. The present invention allows welding to be done in a vacuum by preventing the vacuum from prematurely dispersing the plasma.

18 Claims, 2 Drawing Sheets

METAL INERT GAS WELDING SYSTEM FOR USE IN VACUUM

ORIGIN OF THE INVENTION

This invention was made by an employee of the United States Government and may be manufactured and used by or for the Government for governmental purposes without the payment of any royalties.

BACKGROUND OF THE INVENTION

1. Field of the Invention

The present invention is directed, in general, to a device and method for welding metal and, more specifically, to a device and method for metal inert gas ("MIG") plasma welding that focuses the plasma to allow welding in a vacuum.

2. Description of Related Art

MIG welding devices, in the general sense, are not new. MIG welding is conventionally performed by exciting an inert gas into a plasma state and using the plasma to heat a welding material and a working surface to increase their temperature to a point suitable to accomplish a weld on the working surface.

Prior art MIG welding devices were equipped with a single cavity within which the gas was introduced and excited into a plasma. The welding material, usually in the form of a metal wire, was introduced into this single cavity and heated by the plasma. The working surface was also located adjacent the cavity to allow the plasma to heat the surface. Thus, heating of the gas, the welding material and the working surface all took place within the one cavity.

Under conventional environmental conditions (atmospheric pressure), the prior art MIG welding devices were able to provide sufficient heat to the welding material and the working surface to accomplish a good weld. This was because atmospheric pressure allowed the single cavity sufficiently to confine the plasma to within the single cavity, guaranteeing good heat transfer between the plasma and the welding material and working surface.

An acute need has arisen, however, for welding to be performed in environments where there is little or no atmosphere, e.g., in space. Where there is no atmosphere, there is no atmospheric pressure helping to confine the plasma to within the single cavity of a prior art MIG welding device. Under such conditions, the plasma tends to disperse rapidly into the environment, carrying the heat with it and depriving the welding material and the working surface of the heat required to weld. Such prior art MIG devices may, under such conditions, sporadically accrue a plasma cloud within the single cavity of sufficient density to heat the welding material and the working surface to an extent, but the plasma cloud is unable to stay intact for a sufficient period of time to guarantee a proper heat transfer and a satisfactory weld.

Thus, due to the tendency of low pressure or vacuum environments to disperse the plasma before it can transfer its heat and because prior art MIG welding devices lacked a way to confine the plasma against this tendency to disperse, there is a need in the art for a MIG welding device that can confine and direct plasma to allow welding to occur in a low pressure or vacuum environment.

SUMMARY OF THE INVENTION

It is therefore a primary object of the present invention to provide a MIG welding device that has an ability to contain and focus the plasma to increase the rate of heat transfer from the plasma to the working surface and the welding material. This is to prevent the vacuum from dispersing the plasma prior to heat transfer.

Accordingly, to address the above-noted primary object, the present invention provides a MIG welding device comprising: (1) a substantially spherical pre-plasma cavity having (a) a first opening therein capable of accepting an inert gas into the pre-plasma cavity, (b) first and second electrodes within the pre-plasma cavity capable of applying an electromagnetic field to the inert gas to thereby convert the inert gas into a plasma and (c) a second opening capable of allowing the plasma to exit the pre-plasma cavity and (2) a structure capable of directing the plasma from the second opening of the pre-plasma cavity to a substantially hemispherical arc welding cavity adjacent the second opening, the arc welding cavity capable of being placed adjacent to a working surface, the arc welding cavity further capable of accepting a welding material therein, the plasma impinging on the working surface and the welding material to thereby heat the working surface and the welding material more efficiently. The present invention therefore eliminates a major shortcoming of the prior art: a failure to adequately contain and apply the heat stored in the plasma to the working surface and the welding material.

In a preferred embodiment, the present invention further includes means for regulating a flow rate of the inert gas into the pre-plasma chamber. This regulating means can take the form of a needle or other precision valve placed proximate the first opening. The valve is preferably adjustable to vary the rate at which gas enters the pre-plasma chamber and is preferably provided with an adjustable limit to govern the maximum allowed gas flow. A solenoid can be used to control the axial displacement of the valve.

In a preferred embodiment, the electromagnetic field resonates at a radio frequency. This allows energy in the field to excite atoms within the inert gas, thereby heating the gas and yielding an ionized plasma.

The structure for directing the plasma once it has been created in the pre-plasma chamber is central to the present invention. In a preferred embodiment, the structure comprises an electrical potential difference between the MIG welding device and the working surface. Since the plasma is ionized, this potential difference causes the plasma to accelerate toward the working surface, thereby discouraging the plasma from travelling in any other direction. Furthermore, it is preferable but not necessary to surround the arc welding cavity with a repeller plate. The repeller plate creates a static magnetic field that further confines the plasma within the hemisphere of the arc welding cavity.

The present invention also preferably comprises means for regulating a rate of introduction of the welding material into the arc welding cavity to thereby control application of the welding material to the weld. In addition, the MIG welding device contains, in a preferred embodiment, means for cooling the MIG welding device. This cooling means can comprises fluid circulation pipes within the device to allow coolant to remove heat from the device.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
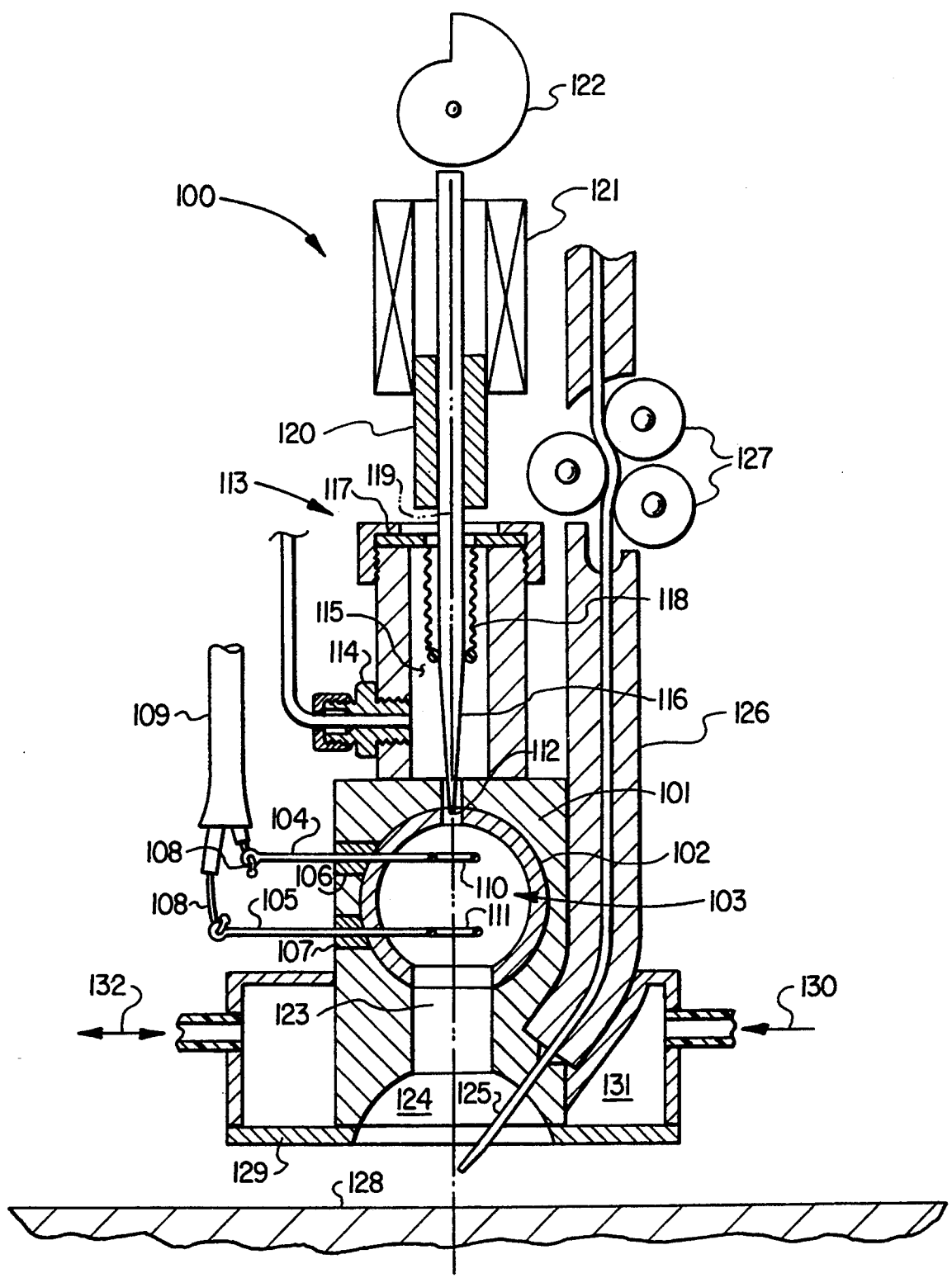
FIG. 1 illustrates a partial side sectional view of the MIG welding device of the present invention.

Referring initially to FIG. 1, illustrated is a partial side sectional view of the MIG welding device of the present invention. The device, generally designated 100 comprises a body 101 having a spherical insulator 102, preferably constructed of ceramic. The spherical insulator 102 defines a pre-plasma cavity 103 that is used to confine plasma prior to welding in a manner that will be detailed below in greater detail.

A first electrode 104 and a second electrode 105 extend through respective first and second insulators 106, 107 and the spherical insulator 102 into the pre-plasma cavity 103. The first and second electrodes 104, 105 are coupled to a source of electromagnetic energy (not shown) by a pair of wire leads 108 disposed within a cable 109 which, in a preferred embodiment of the invention, is a shielded coaxial cable. As mentioned previously, it is preferable that the electromagnetic energy resonate at a radio frequency. For purposes of the present invention, "radio frequency" is defined as any frequency at which coherent electromagnetic radiation is possible, conventionally considered to be a range of frequencies extending from 150 kHz to infrared frequencies. The cable 109 is shielded to reduce interference from or to the energy delivered via the leads 108.

The first and second electrodes 104, 105 are insulated from the body 101 because the body 101 is constructed of metal, a conductor. The body 101 is metal because, as will be explained in more detail, the body is employed as an electrode to create a potential difference to focus and direct plasma ions for welding in a vacuum.

The first and second electrodes 104, 105 terminate within the pre-plasma cavity 103 in respective first and second annular ionization rings 110, 111. As will be explained in more detail below, the ionization rings 110, 111 create an electromagnetic field that excites gas atoms passing therethrough. This excitation converts the atoms to plasma ions for use in welding.

The spherical insulator 102 has a first opening 112 therein adapted to receive inert gas (which, in one embodiment of the invention, is argon) into the spherical insulator 102. Those skilled in the art should realize that other inert gases, such as helium, neon, krypton or xenon, are also more or less suitable for this application. The inert gas travels from a source of pressurized inert gas (not shown, but entirely conventional) through a gas tube 113, preferably constructed of a flexible, insulating plastic. The gas tube 113 is joined to the body 101 with a conventional threaded tube connector 114, allowing inert gas to travel from the source to a plenum 115 within the body 101. A needle valve 116 is employed in the embodiment of the invention shown in FIG. 1 as a means for regulating flow of the inert gas from the plenum 115 to the pre-plasma cavity 103, although other, well-known means for regulating flow fall within the scope of the present invention.

An end plate and seal 117 seals a top end of the plenum 115, allowing it to maintain gas pressure. A valve rod 119 passes through the end plate and seal 117 and is coupled to the needle valve 116. A bellows 118 allows the rod 119 to be axially displaced with respect to the device 100 without compromising the pressure within the plenum 115.

In one embodiment, the rod 119 is coupled to a magnetic member 120. The magnetic member 120 is situated so as to respond to a magnetic field produced by a solenoid coil 121. An axial position of the rod 119 and the needle valve 116 is a function of the presence or absence of the magnetic field in the solenoid coil 121. This arrangement allows the needle valve 116 to be electrically advanced or retarded to adjust the flow rate of the gas from the plenum 115 to the pre-plasma cavity 103. The rate at which the working surface is heated is a function of the rate of gas flow into the pre-plasma cavity 103. Finally, a cam 122 is employed to provide an adjustable limit to the displacement of the rod 119. Thus, the cam 122 allows a user to adjust a maximum gas flow rate. The cam 122 is mounted to the body 101 to allow rotation relative thereto in a conventional manner. The present invention contemplates use of any one of a number of conventional adjustable or nonadjustable travel limiting devices, the application of any one of which to the present invention is apparent to one of ordinary skill in the art.

As previously mentioned, the inert gas enters the pre-plasma cavity 103 and passes through the electromagnetic field caused by the ionization rings 110, 111, converting the gas into an ionized plasma. The electromagnetic field is preferably tuned to resonate at a frequency chosen so as impart the maximum energy to the inert gas. This frequency is a function of the natural resonating frequency of the inert gas atoms and depends, of course, on the particular inert gas chosen.

Once ionized and excited, the pre-plasma cavity 103 serves to confine the plasma, discouraging the plasma from dissipating into a low pressure or vacuum environment surrounding the device 100. The advantage of this arrangement is that the device 100 is suitable for use in the vacuum of space.

A second opening 123 in the spherical insulator allows the plasma to escape under the influence of an electrical potential difference established between the body 101 and a working surface 128. The inert gas, when it is ionized, attains a negative charge. If the body 101 is made negative and the working surface 128 is made positive by application of a DC voltage between the two electrodes (the body 101 and the working surface 128), the negatively ionized plasma will accelerate under the force of the potential difference toward the working surface 128, directing and focusing the plasma to impinge against the working surface 128 and discouraging the plasma from travelling in other directions. In a preferred embodiment of the present invention, this DC voltage is on the order of 30 volts.

The plasma, under influence of this potential difference, accelerates through the second opening 123 to a substantially hemispherical arc welding cavity 124, wherein the accelerated plasma impinges against a welding material 125, supplied in the form of a metal wire, and the working surface 128. Through this impingement, the welding material 125 and the working surface 128 are heated, allowing the welding material 125 to melt and metallurgically bond to the working surface 128, accomplishing a weld thereon.

The welding material 125 is supplied to the arc welding cavity 124 through a wire guide 126 under the force of a plurality of wire feed rollers 127, in one embodiment. The wire feed rollers 127 provide a means for regulating the flow of welding material 125 to the arc welding cavity 124. It is important to regulate the flow of the welding material 125 because one generally wishes to weld as quickly and efficiently as possible while still guaranteeing that the welding material 125 is thoroughly melted to accomplish a strong weld. Thus, if the welding material 125 is fed too slowly, the welding process takes too long and one risks overheating the working surface 128. If the welding material 125 is fed too quickly, the plasma is unable to transfer sufficient energy to the welding material 125 to melt it, compromising any weld that may result.

A repeller plate 129 is preferably bonded to a bottom surface of the body 101. The repeller plate 129 is designed to establish a static magnetic field about the arc welding cavity 124 to further confine and direct the plasma accelerating from the pre-plasma cavity 103 to the arc welding cavity 124. Again, this focuses and directs the plasma to prevent it from prematurely escaping into the environment surrounding the device 100, carrying useful energy with it.

In a preferred embodiment, a means for cooling the device 100 surrounds a lower portion of the body 101. As is apparent, the body 101 becomes hot during operation of the device. This may be uncomfortable to a user attempting to hold the device 100. Any one of a number of conventional cooling fluids, perhaps water, is therefore pumped through a fluid inlet 130 into a cooling chamber 131 surrounding the lower portion of the body 101. The cooling chamber 131 allows the fluid to accept heat from the body 101 and to exit via a fluid outlet 132, perhaps to be externally cooled and recirculated.

Figure 2:
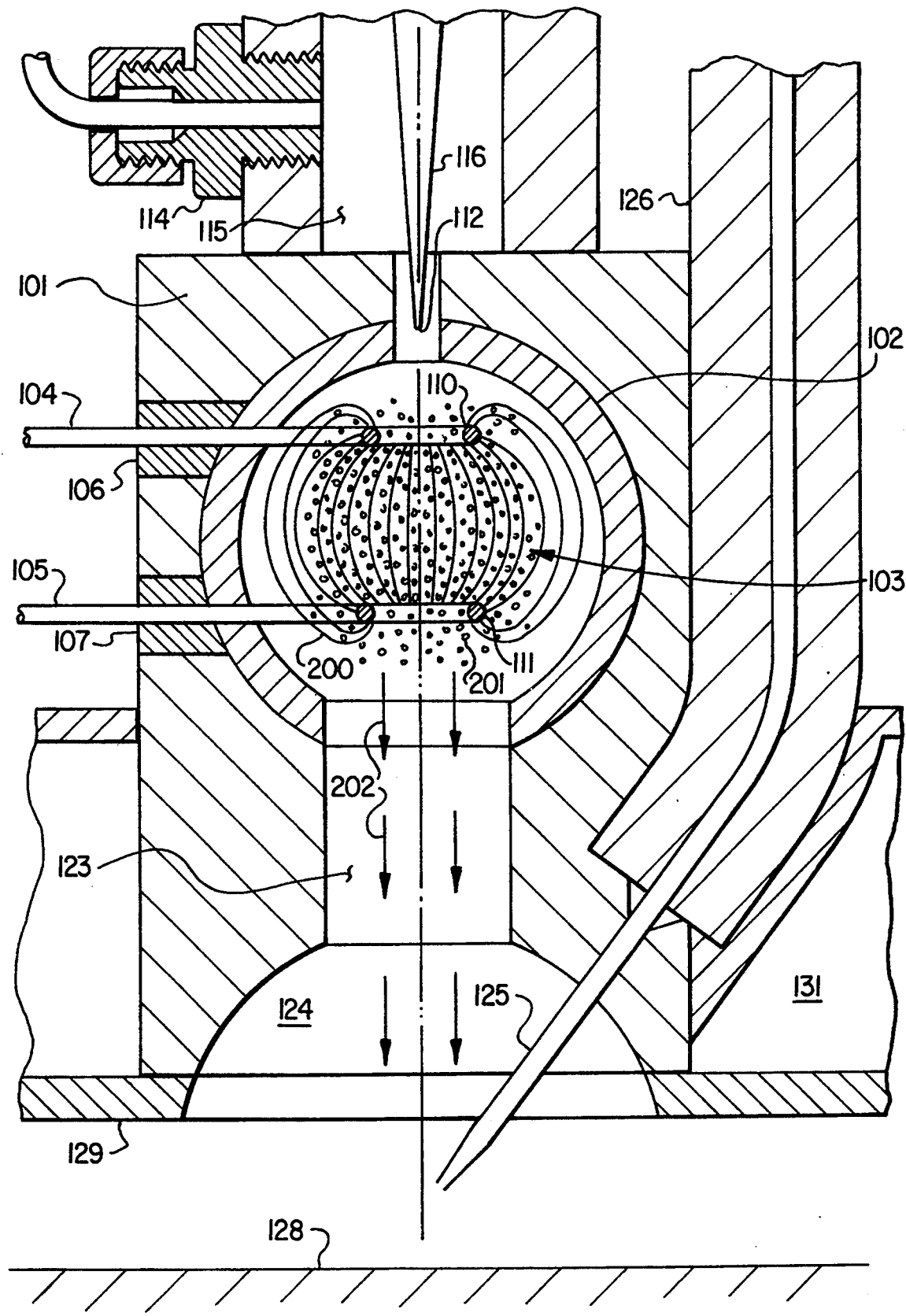
FIG. 2 illustrates an enlarged side sectional view of a portion of the MIG welding device of FIG. 1.

Turning now to FIG. 2, illustrated is an enlarged side sectional view of a portion of the MIG welding device of FIG. 1. FIG. 2 is simply a more detailed view of FIG. 1 showing the electromagnetic fields that influence the plasma. Shown are the spherical insulator 102 defining the pre-plasma cavity 103. The first and second electrodes 104, 105 terminate in the ionization rings 111 that create an electromagnetic field 200 that resonates, as previously described, at a frequency tailored so as to transfer maximum energy to the chosen inert gas to convert it into ionized plasma. The plasma, represented as particles 201, exists as a cloud in the field 200 and, under influence of the potential difference created between the body 101 and working surface 128, begin to accelerate toward the working surface 128 as shown by arrows 202. The accelerating plasma is further focused and confined by the repeller plate 129 to cluster around the welding material 125 and the working surface 128, heating the two to render them suitable for welding.

From the above, it is apparent that the present invention provides a MIG welding device comprising: (1) a pre-plasma cavity having (a) a first opening therein capable of accepting an inert gas into the pre-plasma cavity, (b) first and second electrodes within the pre-plasma cavity capable of applying an electromagnetic field to the inert gas to thereby convert the inert gas into a plasma and (c) a second opening capable of allowing the plasma to exit the pre-plasma cavity and (2) means for directing the plasma from the second opening of the pre-plasma cavity to an arc welding cavity adjacent the second opening, the arc welding cavity capable of being placed adjacent to a working surface, the arc welding cavity further capable of accepting a welding material therein, the plasma impinging on the working surface and the welding material to thereby heat the working surface and the welding material, the directing means focusing the plasma within the arc welding cavity to thereby increase a rate of heat transfer between the plasma and the working surface and the welding material.

Although the present invention and its advantages have been described in detail, it should be understood that various changes, substitutions and alterations can be made herein without departing from the spirit and scope of the invention as defined by the appended claims.

I claim:

1. An inert gas welding device, comprising:
   a pre-plasma cavity for confining a plasma and inhibiting a plasma flow outwardly from said cavity into a low pressure or vacuum environment surrounding said welding device, said pre-plasma cavity having (a) a first opening therein capable of accepting an inert gas into said pre-plasma cavity, (b) first and second electrodes within said pre-plasma cavity capable of applying an electromagnetic field to said inert gas to thereby convert said inert gas into a plasma and (c) a second opening capable of allowing said plasma to exit said pre-plasma cavity; and
   means for directing said plasma from said second opening of said pre-plasma cavity to an arc welding cavity adjacent said second opening, said arc welding cavity capable of being placed adjacent to a working surface, said arc welding cavity further capable of accepting a welding material therein, said plasma impinging on said working surface and said welding material to thereby heat said working surface and said welding material, said directing means focusing said plasma within said arc welding cavity to thereby increase a rate of heat transfer between said plasma and said working surface and said welding material.

2. The inert gas welding device as recited in claim 1 further comprising means for regulating a flow rate of said inert gas into said pre-plasma chamber.

3. The inert gas welding device as recited in claim 1 wherein said electromagnetic field resonates at a radio frequency.

4. The inert gas welding device as recited in claim 1 wherein said directing means comprises an electrical potential difference between said inert gas welding device and said working surface.

5. The inert gas welding device as recited in claim 1 wherein said directing means comprises a repeller plate surrounding said arc welding cavity.

6. The inert gas welding device as recited in claim 1 further comprising means for regulating a rate of introduction of said welding material into said arc welding cavity.

7. The inert gas welding device as recited in claim 1 further comprising means for cooling said inert gas welding device.

8. An inert gas welding device, comprising:
a substantially spherical pre-plasma cavity having (a) a first opening therein capable of accepting an inert gas into said pre-plasma cavity, (b) first and second electrodes within said pre-plasma cavity capable of applying a radio frequency electromagnetic field to said inert gas to thereby convert said inert gas into a plasma and (c) a second opening capable of allowing said plasma to exit said pre-plasma cavity;
means for directing said plasma from said second opening of said pre-plasma cavity to a substantially hemispherical arc welding cavity adjacent said second opening, said means for directing comprising an electrical potential difference between said inert gas welding device and said working surface and a repeller plate surrounding said arc welding cavity, said arc welding cavity capable of being placed adjacent to a metal working surface, said arc welding cavity further capable of accepting a metal welding material therein, said plasma impinging on said metal working surface and said metal welding material to thereby heat said metal working surface and said metal welding material, said directing means focusing said plasma within said arc welding cavity to thereby increase a rate of heat transfer between said plasma and said working surface and said welding material;
means for regulating a flow rate of said inert gas into said pre-plasma chamber;
means for regulating a rate of introduction of said welding material into said arc welding cavity; and
means, coupled to said inert gas welding device, for cooling said inert gas welding device.

9. The inert gas welding device as recited in claim 8 wherein said inert gas flow rate regulating means comprises an axially-displaceable needle valve located proximate said first opening of said pre-plasma cavity.

10. The inert gas welding device as recited in claim 9 further comprising means for limiting an axial travel of said needle valve.

11. The inert gas welding device as recited in claim 10 further comprising solenoid means for axially displacing said needle valve.

12. A method of welding, comprising the steps of:
accepting an inert gas into a first opening of a pre-plasma cavity within an inert gas welding device;
applying an electromagnetic field to said inert gas with first and second electrodes within said pre-plasma cavity to thereby convert said inert gas into a plasma, said pre-plasma cavity confining said plasma and inhibiting a plasma flow from said cavity into a low pressure or vacuum environment surrounding said welding device;
allowing said plasma to exit a second opening of said pre-plasma cavity;
directing said plasma from said second opening of said pre-plasma cavity to an arc welding cavity within said inert gas welding device and adjacent said second opening;
placing said arc welding cavity adjacent to a working surface;
accepting a welding material into said arc welding cavity;
impinging said plasma on said working surface and said welding material to thereby heat said working surface and said welding material; and
focussing said plasma within said arc welding cavity to thereby increase a rate of heat transfer between said plasma and said working surface and said welding material.

13. The method of welding as recited in claim 12 further comprising the step of regulating a flow rate of said inert gas into said pre-plasma chamber.

14. The method of welding as recited in claim 12 wherein said electromagnetic field resonates at a radio frequency.

15. The method of welding as recited in claim 12 wherein said step of directing comprises the step of creating an electrical potential difference between said inert gas welding device and said working surface.

16. The method of welding as recited in claim 12 wherein said step of directing comprises the step of creating a repulsive magnetic field surrounding said arc welding cavity with a repeller plate.

17. The method of welding as recited in claim 12 further comprising the step of regulating a rate of introduction of said welding material into said arc welding cavity.

18. The method of welding as recited in claim 12 further comprising the step of cooling said inert gas welding device.

* * * * *